United States Patent [19]
Garbo

[11] Patent Number: 4,865,543
[45] Date of Patent: Sep. 12, 1989

[54] LIQUID FUEL COMBUSTION WITH POROUS FIBER BURNER

[76] Inventor: Paul W. Garbo, 48 Lester Ave., Freeport, N.Y. 11520

[21] Appl. No.: 200,259

[22] Filed: May 31, 1988

Related U.S. Application Data

[60] Division of Ser. No. 645,538, Aug. 30, 1984, Pat. No. 4,784,599, which is a continuation of Ser. No. 378,109, May 14, 1982, abandoned.

[51] Int. Cl.$^4$ ............................................. F23D 11/44
[52] U.S. Cl. ................................... 431/166; 431/170; 431/212; 431/217; 431/326
[58] Field of Search .................... 431/7, 159, 161, 162, 431/166, 170, 207, 208, 211, 212, 215, 216, 217, 233, 238, 242, 287, 326, 327, 328, 329

[56] References Cited

U.S. PATENT DOCUMENTS

| | | | |
|---|---|---|---|
| 2,319,711 | 5/1943 | Van Almelo | 431/208 |
| 3,199,568 | 8/1965 | Baumanns et al. | 431/215 |
| 3,291,191 | 12/1966 | Stoops | 431/208 |
| 3,383,159 | 5/1968 | Smith | 431/328 |
| 4,067,682 | 1/1978 | Lado | 431/212 |

FOREIGN PATENT DOCUMENTS 2286345  4/1976  France ............................. 431/216

Primary Examiner—Samuel Scott
Assistant Examiner—Noah Kamen
Attorney, Agent, or Firm—Paul W. Garbo

[57] ABSTRACT

Improved combustion of liquid fuel is achieved with a porous fiber burner by forming a mixture of the vaporized fuel and all of the desired combustion air sufficiently heated to prevent condensation of the vaporized fuel, and introducing the heated mixture into the porous fiber burner to effect flameless combustion on the outer surface of the burner. The resulting surface combustion produces a high proportion of radiant heat and increased thermal efficiency while suppressing the formation of nitrogen oxides and other pollutants in the flue gas. Periodically, fuel gas may be supplied to the same porous fiber burner.

9 Claims, 1 Drawing Sheet

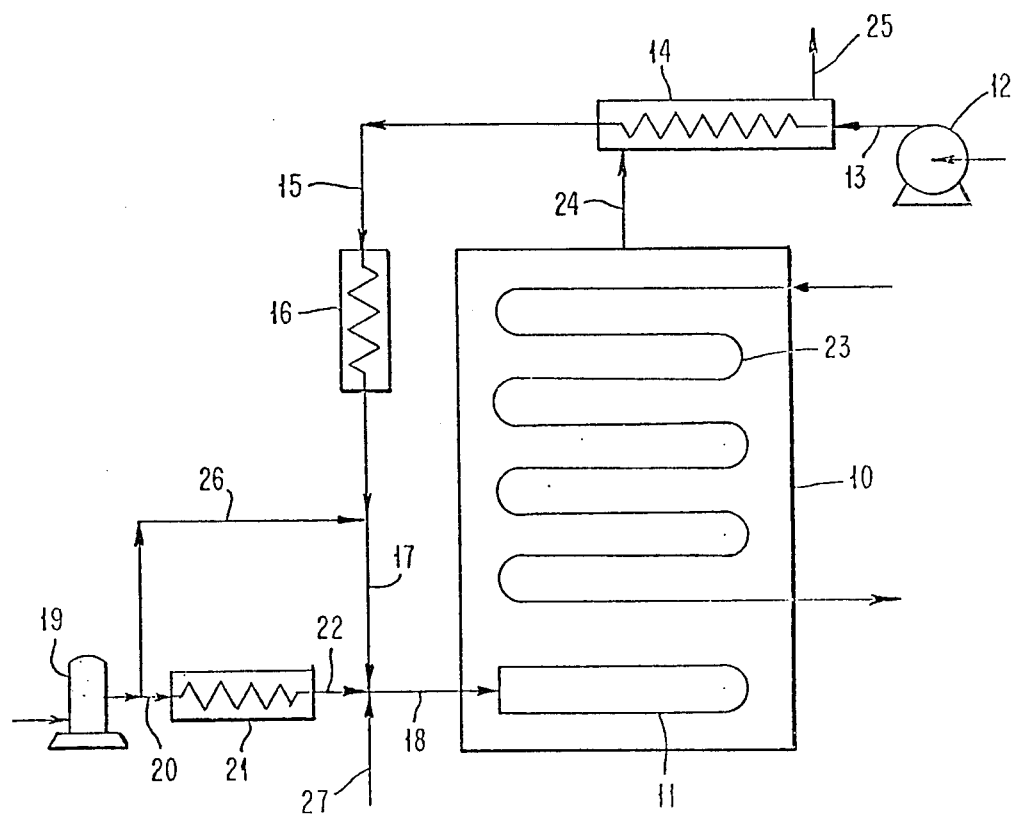

LIQUID FUEL COMBUSTION WITH POROUS FIBER BURNER

This is a division of application Ser. No. 645,358, now U.S. Pat. No. 4,784,599, filed Aug. 30, 1984, which is a continuation of application Ser. No. 378,109, filed May 14, 1982, now abandoned.

BACKGROUND OF THE INVENTION

This invention relates to the combustion of liquid fuel with a porous fiber burner to achieve increased thermal efficiency and decreased formation of atmospheric pollutants.

It is known that porous fiber burners for fuel gases yield high thermal efficiency while suppressing the content of nitrogen oxides ($NO_x$), carbon monoxide (CO) and unburned hydrocarbons in the combustion products or flue gas. With the growing need to limit the discharge of pollutants into the atmosphere and with the pressure for greater thermal efficiency caused by high fuel costs, the use of porous fiber burners has been given new impetus.

No simple, practical burner for liquid fuels has been available to give the good results obtained by burning fuel gas with a porous fiber burner. Unfortunately, a porous fiber burner becomes inoperative when a liquid fuel is injected into it. Hence, there is great need to make the combustion of liquid fuel as efficient and pollution-free as that attainable with fuel gas.

Accordingly, a principal object of this invention is to improve the combustion of liquid fuels to yield high thermal efficiency and low emission of atmospheric pollutants.

Another important object is to carry out the combustion of liquid fuels through the use of porous fiber burners.

Still another object is to provide simple and economic apparatus for conducting the combustion of liquid fuels with porous fiber burners.

A further object is to provide a combustion system with a porous fiber burner that can be readily switched from a supply of liquid fuel to a supply of fuel gas.

These and other objects and advantages of the invention will be evident from the description which follows.

SUMMARY OF THE INVENTION

In accordance with this invention, the combustion of a liquid fuel is conducted by forming a mixture of the vaporized fuel and all of the desired combustion air sufficiently preheated to prevent condensation of the vaporized fuel, and introducing the hot gaseous mixture into a porous fiber burner to effect flameless combustion on the outer surface of the burner. Besides producing considerable radiant heat, the flameless combustion of the originally liquid fuel yields a flue gas with a low content of $NO_x$, CO and unburned hydrocarbons. Generally, the $NO_x$ content of the flue gas is below about 20 ppm (parts per million).

While any vaporizable fuel may be used in accordance with this invention, for the usual residential or commercial heating plant the liquid fuel is a petroleum or other hydrocarbon fraction that can be completely vaporized and has an end boiling point not exceeding about 650° F. Preferably, the liquid fuel will have an end boiling point not exceeding about 500° F.

A feature of porous fiber burners is that all of the combustion air is supplied as primary air which rarely is more than 25% in excess of the stoichiometric requirement. Generally, not more than about 15% excess air is used in accordance with this invention.

The production of porous fiber burners is well known. Burners made according to the teachings of U.S. Pat. No. 3,275,497 are preferred, particularly when such burners include aluminum powder in the porous fiber layer as disclosed in U.S. Pat. No. 3,383,159.

Vaporizing the liquid fuel can be carried out by passing it through the heated coil or tubes of a vaporizer or by spraying it into the hot combustion air which initially must have a high enough temperature to ensure complete vaporization of the liquid fuel. The liquid fuel can also be preheated and then vaporized by injection into the hot combustion air.

An important advantage of the liquid fuel combustion system of this invention is that the system can be simply and readily operated with fuel gas, such as natural gas, as efficiently and low in pollutants emission as with liquid fuel. Simultaneous combustion of both a liquid fuel and a fuel gas is also possible without diminishing the thermal efficiency and suppression of pollutants formation characteristic of flameless surface combustion with a porous fiber burner.

Combustion air is preheated in any known manner, usually by indirect heat exchange with the hot flue gas from the combustion of the liquid fuel pursuant to this invention. When available, waste heat from an independent operation may be used to preheat the combustion air or to augment the amount of preheating. Temperature in degrees Fahrenheit (°F.) is a convenient measure of the amount of preheat in the combustion air and its admixture with vaporized liquid fuel. As previously mentioned, the preheat temperature of the vaporized fuel-air mixture must be high enough to prevent any condensation or misting of the fuel vapor. Even with a liquid fuel having a low boiling range, such as naphtha, the preheat temperature of the vaporized fuel-air mixture will rarely be less than 150° F. and with a higher boiling liquid fuel, such as kerosene, the preheat temperature of the vaporized fuel-air mixture will generally be at least 400° F. A preheat temperature above 1000° F. is seldom justified economically and with some vaporized liquid fuels may cause preignition or flash-back before the mixture passes through the porous fiber layer of the burner.

BRIEF DESCRIPTION OF THE DRAWING

For further clarification of the invention, the ensuing description will refer to the appended drawing which is a diagrammatic representation of a combustion system operable in accordance with several preferred embodiments of the invention.

DESCRIPTION OF PREFERRED EMBODIMENTS

The drawing shows a combustion system in which furnace 10 is equipped with porous fiber burner 11 in the bottom portion thereof. Combustion air supplied by blower 12 passes through pipe 13, heat exchanger 14, pipe 15, heater 16 and pipe 17 into pipe 18 which discharges into burner 11.

Liquid fuel is fed by pump 19 through pipe 20 into heater 21 wherein the liquid fuel may be heated or even completely vaporized. The heated or vaporized fuel flows from heater 21 through pipe 22 into pipe 18 wherein it mixes with the preheated combustion air to form a hot, completely gaseous mixture which is supplied to porous fiber burner 11.

One way of starting the operation of this combustion system involves supplying heat to the combustion air through heater 16 and to the liquid fuel through heater 21 so that the liquid fuel is completely vaporized when it flows through pipe 18 in admixture with the preheated combustion air into burner 11. Any convenient source of heat, such as electrical resistance or combustion of a fuel, may be utilized in heater 16 and heater 21.

Upon igniting the preheated mixture of vaporized fuel and combustion air issuing at the exterior surface of porous fiber burner 11, flameless surface combustion takes place with the result that the entire exterior surface of burner 11 is substantially a uniform source of radiant heat. Water or other desired fluid flowing through coil 23 in furnace 10 absorbs radiant heat from burner 11 as well as heat from the hot combustion products or flue gas rising through furnace 10. The cooled but still hot flue gas discharges from furnace 10 through pipe 24 into heat exchanger 14 wherein it flows counter-current to the combustion air supplied by blower 12 and pipe 13 and thus transfers more of its heat to the air stream. The further cooled flue gas leaves exchanger 14 through pipe 25.

As the temperature in furnace 10 gradually rises from the time that burner 11 is ignited, so will the temperature of the flue gas passing through exchanger 14 also rise until the combustion system reaches a steady state. During the period when temperatures in exchanger 14 are increasing and the air stream is therefore receiving more and more preheat, the amount of heat added to the combustion air by heater 16 may be gradually diminished. Depending on the specific design of the combustion system and its operation, when the steady state is reached, the flue gas passing through exchanger 14 may in some cases preheat the combustion air sufficiently so that no further heat need be introduced into the air stream during its passage through heater 16. In other cases where steady state operation does not furnish all of the desired preheat to the combustion air by indirect exchange with the flue gas leaving furnace 10, the amount of preheat received by the air stream in exchanger 14 is supplemented by heat from heater 16.

Again, when steady state operation is attained, it is possible that the combustion air preheated in exchanger 14 may be hot enough, with or without added heat from heater 16, to vaporize the liquid fuel completely when the fuel is diverted through pipe 26 and injected or sprayed into the hot air flowing through pipe 17. Further use of heater 21 is then discontinued.

In the foregoing discussion of the combustion system of this invention, start-up of operation was achieved by introducing preheat into combustion air through heater 16 and by heating the liquid fuel in heater 21. Alternatively, the start-up operation may be simply carried out by supplying a fuel gas, such as natural gas or propane, through pipe 27 to pipe 18 wherein it mixes with combustion air from pipe 17. The unheated mixture entering burner 11 is ignited on emanating from the outer surface of the porous fiber layer of burner 11. The resulting flameless surface combustion yields infra-red radiation and hot products of combustion which gradually raise the temperatures of furnace 10, heat exchanger 14 and the combustion air flowing therethrough. As soon as steady state operation is attained, the preheated combustion air from exchanger 14, with or without any additional preheat from heater 16 as may be needed, is ready to be mixed with the liquid fuel instead of the fuel gas. At that time, pump 19 is put into operation to feed the liquid fuel to heater 21 or to pipe 26 for injection into pipe 17 if the combustion air has sufficient preheat to vaporize the fuel. In either case, simultaneously, the flow of fuel gas from pipe 27 is stopped and the hot mixture of combustion air and vaporized fuel flows through pipe 18 into burner 11 to continue flameless surface combustion on its outer surface.

In describing the start-up operation of the combustion system by using a fuel gas, it is obvious that the invention provides a combustion system that functions with liquid fuel or fuel gas or even a mixture of both and delivers high thermal efficiency and low emission of pollutants in all cases. This is an outstanding advantage of the invention inasmuch as prior efficient combustion systems are usually designed to give optimum results when burning only liquid fuel or fuel gas and hence the fuel supply to such prior systems cannot be switched from liquid to gas or vice versa. When a fuel gas is available to start up the operation of the combustion system illustrated in the drawing, and the system is designed to preheat the combustion air through heat exchanger 14 to a temperature high enough that the liquid fuel is completely vaporized just by injection into the hot air stream, the system can be further simplified by the elimination of heater 16 and heater 21.

As an example of the invention, light naphtha with an initial boiling point of 110° F. and an end boiling point of 315° F. is selected as the liquid fuel. Porous fiber burner 11 in furnace 10 is designed for a nominal firing rate of 80,000 BTU/h (British Thermal Units per hour). Naphtha is fed by pump 19 at the rate of 4 lb/h (pounds per hour) and combustion air is supplied by blower 12 at the rate of 63 lb/h which is about 5% excess air. Inasmuch as the combustion air leaves heat exchanger 14 at a temperature of 215° F., the naphtha at ambient temperature of 70° F. is completely vaporized by spraying it into the preheated air. The resulting mixture of vaporized naphtha and combustion air has a temperature of about 150° F. whereas the dew point of the mixture is below 100° F.

The flameless combustion of the mixture on the outer surface of porous fiber burner 11 makes that surface a uniform emitter of infra-red energy and yields a flue gas with an $NO_x$ content of 15 ppm. The content of CO and unburned hydrocarbons is also very small.

In another example of the invention, kerosene with an initial boiling point of 305° F. and an end boiling point of 540° F. is heated to a temperature of 280° F. by passage through heater 21. Combustion air preheated to temperature of 350° F. is mixed with the preheated kerosene in pipe 18 to provide 10% excess air and to effect complete vaporization of the kerosene. The resulting mixture has a temperature of about 340° F. and a dew point of about 275° F.

The kerosene has a net heating value of 18,340 BTU/lb and is fed to furnace 10 with a nominal heating capacity of 150,000 BTU/h at the rate of 9 lb/h which is a firing rate equal to 110% of the design capacity of furnace 10. Even with this firing overload, porous fiber burner 11 is uniformly radiant and yields a flue gas with an $NO_x$ content of 17 ppm and very little CO and unburned hydrocarbons.

In still another example of the invention, diesel oil with an initial boiling point of 345° F. and an end boiling point of 660° F. is preheated to a temperature of 365° F. in heater 21. Combustion air is preheated to a temperature of about 460° F. and is mixed with the preheated diesel oil to provide 15% excess combustion air. As a result, the mixture has a temperature of 445° F. and all of the diesel oil is in vapor form. The dew point of the gaseous mixture is not more than 360° F.

Furnace 10 with porous fiber burner 11 having a rated heating capacity of 300,000 BTU/h is fed the vaporized diesel oil at the rate of 16.5 lb/h, the oil having a net heating value of 18,240 BTU/lb.

Flameless combustion of the hot mixture on the outer surface of burner 11 produces a high proportion of radiant heat and a flue gas with an $NO_x$ content of 19 ppm. The flue gas also contains negligible amounts of CO and unburned hydrocarbons.

To summarize, burning a liquid fuel through the use of a porous fiber burner achieves several noteworthy advantages. The formation of $NO_x$, CO and unburned hydrocarbons in the flue gas is suppressed. High thermal efficiency is attained not only because considerable radiant heat is generated but also because large amounts of excess combustion air are avoided. The combustion system of the invention provides great operational flexibility including variation of the liquid fuel and even its replacement by fuel gas.

While the examples involve petroleum fractions as the liquid fuel fed to the porous fiber burner in vapor form, similar hydrocarbon fractions can be obtained from tar sands, shale oil, coal liquefaction and synthetic fuels. In the future, such other liquid fuels may be economically attractive. The same may also be possible with liquid fuels such as alcohols derived from agricultural products. Hence, the liquid fuel selected for combustion in accordance with this invention may vary greatly so long as it is completely vaporizable. Obviously, the liquid fuel must be free of any ash residue. The selected liquid fuel should also have a low sulfur content to comply with the sulfur emission limitations of applicable ordinances.

It should be noted that heater 21 is preferably used in most cases to merely preheat the liquid fuel rather than to completely vaporize it. There are two good reasons for this preference. The high temperature required in heater 21 to completely vaporize the liquid fuel may cause cracking and the formation of unvaporizable residues particularly with liquid fuels having an end boiling point exceeding about 500° F. Moreover, the large volume of combustion air which is mixed with the liquid fuel depresses the dew point substantially below the end boiling point of the liquid fuel. Thus, in the example using kerosene with an end boiling point of 540° F., the liquid fuel is preheated to a temperature of only 280° F. and yet is completely vaporized when mixed with 10% excess air preheated to a temperature of only 350° F. because the resulting hot mixture has a dew point of about 275° F.

Many variations and modifications of the invention will be apparent to those skilled in the art without departing from the spirit or scope of the invention. For example, if waste heat from an independent operation is available, it may be used to preheat the combustion air and heat exchanger 14 may be eliminated. When heater 16 is installed to facilitate start-up of the combustion system and heat exchanger 14 supplies all of the desired preheat to the combustion air when steady state operation is attained, the flow of hot combustion air may be diverted from pipe 15 through a by-pass pipe directly into pipe 18. Also, part of the combustion air flowing in pipe 13 may be diverted to a by-pass pipe discharging directly into pipe 15 so that the temperature of all the air in pipe 15 is adjusted to a desired temperature. Accordingly, only such limitations should be imposed on the invention as set forth in the appended claims.

What is claimed is:

1. An improved combustion system for liquid fuel to yield high thermal efficiency and flue gas with low $NO_x$ content, which comprises a furnace, a porous fiber burner within said furnace, a countercurrent heat exchanger connected to said furnace to receive the flow of flue gas from said furnace, an air blower connected to a passage in said heat exchanger to inject the flow of combustion air therethrough countercurrent to said flow of said flue gas, a pipe connected to the discharge end of said passage and to the inlet of said porous fiber burner, and a pump connected to feed liquid fuel into said pipe.

2. The improved combustion system of claim 1 wherein the porous fiber burner contains a uniformly distributed, small amount of fine aluminum powder.

3. The improved combustion system of claim 2 wherein an air heater is connected to heat the flow of combustion air in the pipe connected to the discharge end of the passage in the heat exchanger.

4. The improved combustion system of claim 1 wherein a liquid heater is connected to heat liquid fuel fed by the pump into the pipe.

5. The improved combustion system of claim 4 wherein the porous fiber burner contains a uniformly distributed, small amount of fine aluminum powder.

6. The improved combustion system of claim 1 wherein a gas main is connected to feed fuel gas into the pipe connected to the inlet of the porous fiber burner.

7. The improved combustion system of claim 6 wherein the porous fiber burner contains a uniformly distributed, small amount of fine aluminum powder.

8. The improved combustion system of claim 7 wherein a liquid heater is connected to heat the liquid fuel fed by the pump into the pipe.

9. The improved combustion system of claim 8 wherein an air heater is connected to heat the flow of combustion air in the pipe connected to the discharge end of the passage in the heat exchanger.

* * * * *